(12) United States Patent
Huijzer et al.

(10) Patent No.: US 10,520,342 B2
(45) Date of Patent: Dec. 31, 2019

(54) ULTRASONIC FLOWMETER

(71) Applicant: KROHNE AG, Basel (CH)

(72) Inventors: Arie Huijzer, Sliedrecht (NL); Jeroen Martin van Klooster, Tiel (NL)

(73) Assignee: KROHNE AG, Basel (CH)

( * ) Notice: Subject to any disclaimer, the term of this patent is extended or adjusted under 35 U.S.C. 154(b) by 8 days.

(21) Appl. No.: 15/974,838

(22) Filed: May 9, 2018

(65) Prior Publication Data

US 2018/0328768 A1    Nov. 15, 2018

(30) Foreign Application Priority Data

May 12, 2017    (DE) .......................... 10 2017 110 308

(51) Int. Cl.
*G01F 1/66*    (2006.01)
(52) U.S. Cl.
CPC .................................... *G01F 1/662* (2013.01)
(58) Field of Classification Search
CPC ....................................................... G01F 1/66
See application file for complete search history.

(56) References Cited

U.S. PATENT DOCUMENTS

| | | | |
|---|---|---|---|
| 4,856,321 A | 8/1989 | Smalling et al. | |
| 5,372,047 A | 12/1994 | Russwurm et al. | |
| 5,546,812 A | 8/1996 | Drenthen | |
| 7,077,012 B2* | 7/2006 | Hirayama | G01F 1/662 |
| | | | 73/861.25 |
| 8,534,138 B2* | 9/2013 | Gottlieb | G01F 1/667 |
| | | | 73/861.28 |
| 8,689,638 B2* | 4/2014 | Shen | G01F 1/662 |
| | | | 73/861.25 |
| 9,097,567 B2 | 8/2015 | Wiest et al. | |
| 9,528,866 B2 | 12/2016 | Wiest et al. | |
| 9,903,745 B2* | 2/2018 | Drachmann | G01F 1/662 |
| 2004/0123673 A1 | 7/2004 | Moscaritolo et al. | |
| 2012/0125121 A1* | 5/2012 | Gottlieb | G01F 1/662 |
| | | | 73/861.28 |

(Continued)

FOREIGN PATENT DOCUMENTS

| | | |
|---|---|---|
| CN | 201508256 U | 6/2010 |
| EP | 0392294 A1 | 10/1990 |

(Continued)

*Primary Examiner* — Jewel V Dowtin
(74) *Attorney, Agent, or Firm* — David S. Safran; Roberts Mlotkowski Safran Cole & Calderon, P.C.

(57) ABSTRACT

An ultrasonic flowmeter is provided with at least one measuring tube having at least one recess. Disposed in the recess are at least a first ultrasonic transducer and a second ultrasonic transducer, wherein the first ultrasonic transducer is designed as an ultrasonic transmitter and/or as an ultrasonic receiver and the second ultrasonic transducer is designed as an ultrasonic transmitter and/or as an ultrasonic receiver. Further disposed in the recess is at least one reflection surface. The first and second ultrasonic transducers are arranged on the measuring tube such that the measuring path between the first and the second ultrasonic transducers comprises at least one reflection at the reflecting surface. The provision of the reflection surface in the recess provides an ultrasonic flowmeter with which the flow profile can be easily measured, especially in the edge region.

9 Claims, 7 Drawing Sheets

(56) References Cited

U.S. PATENT DOCUMENTS

| | | | |
|---|---|---|---|
| 2013/0104667 A1* | 5/2013 | Koyano | G01F 1/662 73/861.25 |
| 2014/0144247 A1 | 5/2014 | Wiest et al. | |
| 2016/0187171 A1* | 6/2016 | Feller | G01F 1/662 73/861.28 |
| 2017/0314977 A1 | 11/2017 | Wiest et al. | |

FOREIGN PATENT DOCUMENTS

| | | |
|---|---|---|
| WO | 9624029 A1 | 8/1996 |
| WO | 2008/053193 | 5/2008 |

\* cited by examiner

ULTRASONIC FLOWMETER

BACKGROUND OF THE INVENTION

Field of the Invention

The invention relates to an ultrasonic flowmeter with at least one measuring tube, wherein the measuring tube has at least one recess, with at least a first ultrasonic transducer and a second ultrasonic transducer, wherein the first ultrasonic transducer is designed as an ultrasonic transmitter and/or as an ultrasonic receiver and wherein the second ultrasonic transducer is designed as an ultrasonic transmitter and/or as an ultrasonic receiver having at least one reflection surface, wherein the first and the second ultrasonic transducer are arranged on the measuring tube, such that the measuring path between the first and the second ultrasonic transducer comprises at least one reflection at the reflection surface.

The measurement of the flow of a medium flowing through a measuring tube using an ultrasonic flowmeter is known in the prior art. Ultrasonic flowmeters generally have a measuring tube and at least two ultrasonic transmitters designed as ultrasonic transmitters and/or ultrasonic receivers, which are arranged at a distance from one another on the measuring tube in the flow direction (axially along the measuring tube axis). To measure the flow, an ultrasonic signal is emitted along the measuring path between the ultrasonic transducers both in the direction of flow and opposite to the direction of flow. The duration or transit time of signals that move along a measuring path with the flow is different from the transit time of signals moving against the flow due to an entrainment effect. The flow velocity is determined from the transit time difference, as well as the volume flow rate when the measuring tube cross section is taken into account.

In determining flow speed, the flow profile of the flowing medium is also to be considered. Basically, laminar and turbulent flow profiles should be distinguished. The formation of a turbulent or laminar flow is particularly dependent on the Reynolds number.

In order to ensure the lowest possible error in the determination of the speed of flow, it is known to measure the flow profile both in the region of the measuring tube axis at $r=0$ $R_1$ and in the edge regions at a radius $r>0.5$ $R_1$, where $R_1$ is the inner measuring tube radius.

Description of Related Art

EP 0 639 776 B1 corresponding to U.S. Pat. No. 5,546,812 discloses an ultrasonic flowmeter in which the ultrasonic signal passes through acoustic paths which have different degrees of sensitivity with respect to swirling of the medium. In this case, the signals emitted by the ultrasonic transmitter are received by the ultrasonic receiver after at least two reflections against the inner wall of the measuring tube. The ultrasonic signals pass through a large part of the measuring tube cross-section and thus provide a reliable picture of the flow.

DE 10 2012 013 916 A1 corresponding to U.S. Pat. No. 9,528,866 B2 discloses an ultrasonic flowmeter with two ultrasonic transducers arranged on a measuring tube, wherein the ultrasonic transducers are arranged in such a way that the measuring path has a plurality of reflection surfaces between the ultrasonic transducers. The measuring path has at least three straight subsections between the ultrasonic transducers. The minimum distances of the three sections to the measuring tube axis are between 0.4 and 0.8 $R_1$, where $R_1$ is the measuring tube radius. Also shown is an embodiment in which the ultrasonic signal reaches the ultrasonic receiver via five reflection surfaces.

In contrast to the aforementioned prior art, it is the object of the present invention to provide an ultrasonic flowmeter with which the flow profile can be particularly easily measured, especially in the edge region.

SUMMARY OF THE INVENTION

According to the invention, this object is achieved by arranging the reflection surface in a recess in the inner wall of the tube. In such a case, the reflection surface is set back in relation to the inner measuring tube wall. In the context of the present invention, a recess is understood as meaning both a local reduction of the material thickness and a material recess, that is to say a blind hole in the material.

Due to the rearrangement of the reflection surface in a recess in the inner wall of the tube, the measuring path between the ultrasonic transducers can be shifted into the edge region of the flow profile due to the changed emission angle. Advantageously, the edge region of the flow profile can thus be measured particularly easily.

According to an advantageous embodiment, the ultrasonic flowmeter has at least a first and at least a second reflection surface and at least a first and a second recess, wherein the first reflection surface is arranged in the first recess and the second reflection surface is arranged in the second recess and wherein the first and the second ultrasonic transducers are arranged in the measuring tube such that the measuring path between the ultrasonic transducers comprises at least one reflection at the first reflection surface and at least one reflection at the second reflection surface.

This design has the advantage that the flow profile can be measured particularly accurately in the edge region at a radius $r>0.5$ $R_1$ with only two ultrasonic transducers. The measuring path between the ultrasonic transducers forms an equilateral triangle in axial plan view. Using the geometric relationships of an equilateral triangle, the depth of the recess can be determined using the formula: $R_2=2\cdot x_1\cdot R_1$, where $R_2$ is the distance of the reflection point to the measuring tube axis, where $x_1$ is between 0 and 1, in particular between 0.5 and 1, and where $R_1$ is the inner measuring tube radius.

According to a further design, the reflection surface is configured flat or concave or in the form of a circular arc. Particularly advantageously, the reflection surface is designed as a circular arc of a circle with a radius of curvature $R_2$.

It is also advantageous when the sidewalls of the recess are designed obliquely and, in particular, include an obtuse angle to the reflection surface. This design has the advantage that the ultrasonic signal can enter the recess and leave the recess at a larger angle and, that the flowing medium is less disturbed by the slanted sides.

The at least one recess can be an axially extending recess which is introduced into the measuring tube, for example by means of machining, in particular with a broaching tool.

In a further advantageous design, a reflection element with a reflection surface is arranged in the at least one recess. Due to the reflection element being introduced as a separate component in the recess, it can be particularly flexibly designed, in particular adapted to the flow of fluid. The recess can, in particular, be designed as a hole in which the reflection element is arranged in a sealing manner. This design has the advantage that the disruption of the flow of fluid caused by the recess can be minimized.

If the flow entering the recess is at an angle, with respect to a perpendicular direction to the reflection surface that is greater than the critical angle according to Snell's law of refraction, then in addition to the reflection of the ultrasonic signal, surface waves are also excited. These surface waves are guided to the ultrasonic receiver both via the medium and via the measuring tube itself. These waves interfere with the signal to be measured and are therefore undesirable.

According to a further advantageous design, the reflection recess may have a special geometry for suppressing or minimizing this interference signal, wherein the interference signal is guided away from the ultrasonic receiver due to the geometric configuration of the reflection recess.

According to a particularly advantageous design, the reflection recess is designed such that the inner surface facing the medium has the shape of the top surface of a truncated cone. In the context of the present invention, a cover surface is understood to be the outer surface of a truncated cone. Preferably, the edge of the truncated cone has the shape of a section of the truncated cone foot with a part of a cylinder. Particularly preferably, the cylinder has a circular or oval base. According to a further design, the edge of the truncated cone foot has the shape of a section of the truncated cone with a half cylinder or with a part of a cylinder whose outer surface comprises a circular arc that is smaller than a semicircle.

In this case, the reflection surface is preferably designed such that the largest possible part of the ultrasonic signal is reflected. For example, the reflection surface is designed in a circle with a diameter D, where D essentially corresponds to the cross section of the ultrasonic signal. If further surface waves are excited, which, inter alia, emit interference signals in the medium, these interference signals are not emitted in the direction of the receiver due to the oblique side surfaces of the truncated cone. The disturbance of the flow or the containment of the medium can be minimized due to the oblique side surfaces of the truncated cone.

In a further design, the reflection element consists at least partially of synthetic material or metal, in particular bronze, brass, steel, aluminum or titanium.

The use of these materials ensures minimization of the previously-described interference or Rayleigh effect.

According to a further design, at least one further recess is provided, wherein the first and/or the second ultrasonic transducer is or are arranged in the at least one further recess. According to this design, the ultrasonic transducers are arranged in the measuring tube such that they do not influence the flow. Preferably, the ultrasonic transducers are also set back, whereby the measuring path is located between the ultrasonic transducers in the edge region of the flow profile at a radius $r > 0.5\ R_1$.

Particularly preferably, the ultrasonic transducers are arranged at least partially in the lower half of the measuring tube. This design has the advantage that if the medium has air or gas bubbles, these do not accumulate in the region of the ultrasonic transducers, and in particular not in the recesses in which the ultrasonic transducers are arranged, thus causing a measurement error.

According to a further preferred design, at least a third and a fourth ultrasonic transducer are provided, each of which is designed as an ultrasonic transmitter and/or as an ultrasonic receiver, wherein the third and fourth ultrasonic transducers are arranged offset in the flow direction on the measuring tube such that the measuring path crosses the measuring tube axis between the third and the fourth ultrasonic transducer at $r = 0\ R_1$.

In detail, there are a plurality of possibilities for designing and further developing the ultrasonic flowmeter according to the invention. Reference is made to both the claims subordinate to the independent claim and to the following description of preferred embodiments in conjunction with the drawings described below.

DETAILED DESCRIPTION OF THE INVENTION

Figure 1:
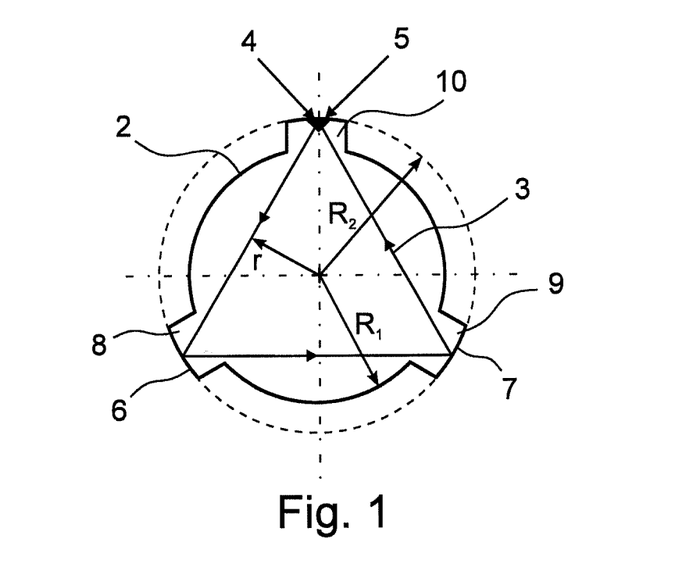
FIG. 1 is a schematic sectional view of a measuring tube according to a first embodiment of a flowmeter with the measuring path through which the ultrasonic signal passes.

FIG. 1 shows a schematic sectional illustration of a measuring tube 2 according to a first embodiment of an ultrasonic flowmeter 1 with the measuring path 3 through which the ultrasonic signal passes. A first ultrasonic transducer 4 and a second ultrasonic transducer 5 are arranged offset from one another in the flow direction. The signal emitted from the ultrasonic transducer 4, 5 designed as an ultrasonic transmitter reaches the ultrasonic transducer 4,5 designed as an ultrasonic receiver after reflection at a first reflection surface 6 and after reflection at a second reflection surface 7. The resulting measuring path 3 has the shape of an equilateral triangle in an axial plan view.

The reflection surfaces 6, 7 are arranged in respective recesses 8, 9 and the ultrasonic transducers 4, 5 are arranged in a recess 10 of the measuring tube 2. As a result of both the reflecting surfaces 6, 7 and the ultrasonic transducers 4, 5 being set back from the inner wall of the tube 2, the flow profile within the measuring tube 2 can advantageously be measured in the edge region at a measuring range $r > 0.5\ R_1$, wherein $R_1$ is the measuring tube radius. Any error in determining the speed of the medium due to a turbulent or laminar design of the flow profile is particularly small due to the measurement in the edge region. In this respect, the flow profile in the edge region can be measured particularly accurately with only two ultrasonic transducers 4, 5 using the embodiment shown in FIG. 1.

With the help of the geometric relationships of an equilateral triangle, the depth of the recess and the distance $R_2$ of the reflection point to the measuring tube axis at a known measuring tube radius $R_1$ can be easily calculated as follows: $R_2 = 2 \cdot X_1 \cdot R_1$. If, for example, the inner measuring tube radius is $R_1 = 10$ mm and the range is measured at $r = 0.7\ R_1$ or at $r > 0.7\ R_1$, then the distance to the reflection point is $R_2 = 14$ mm.

In the illustrated embodiment, the reflection surfaces 6, 7 are configured as a circular arc of a circle with the radius $R_2$.

Figure 2:
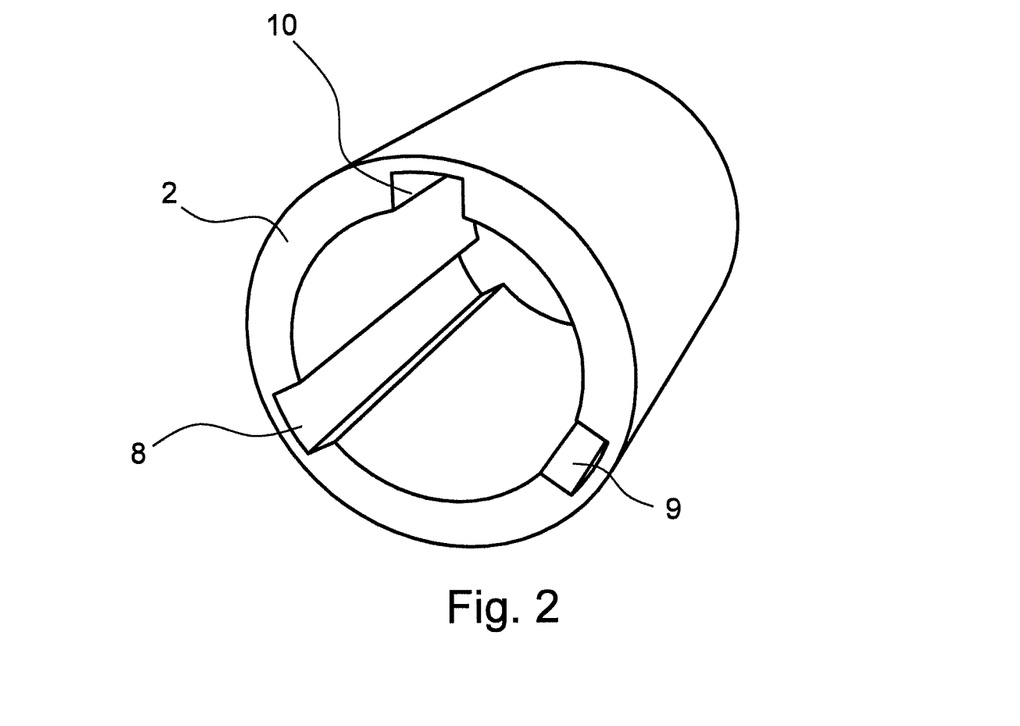
FIG. 2 is a second illustration of the measuring tube according to the first embodiment of a flowmeter, FIGS. 3a-3c each illustrate a different embodiment of the recess.

FIG. 2 shows a second illustration of the measuring tube 2 according to the first embodiment of a flowmeter 1, wherein the measuring tube 2 has recesses 8, 9 and 10. The recesses 8, 9 and 10 are axial recesses, which are introduced in the measuring tube 2 by machining.

Figure 3A:
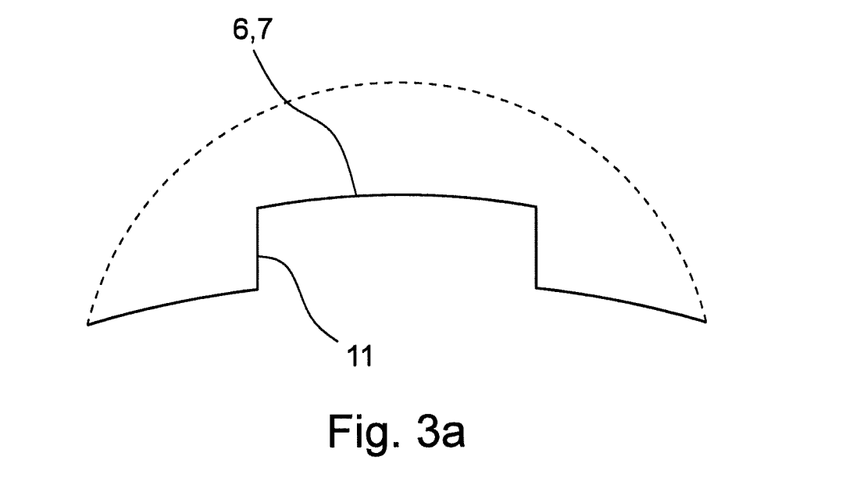
Figure 3B:
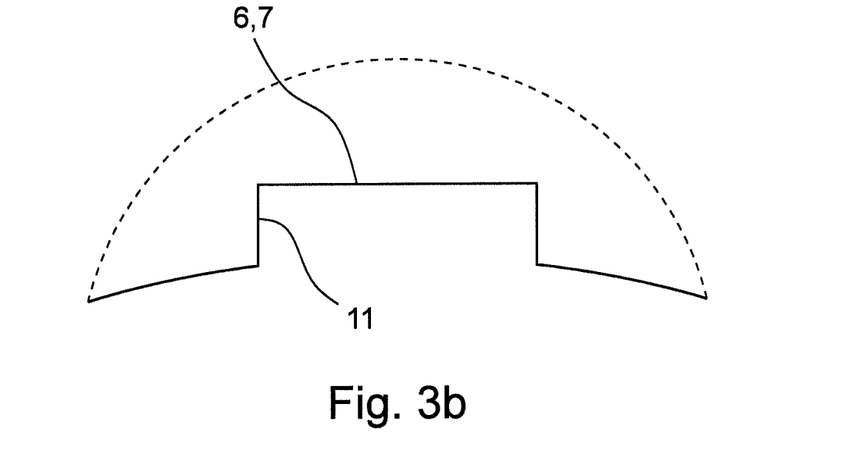
Figure 3C:
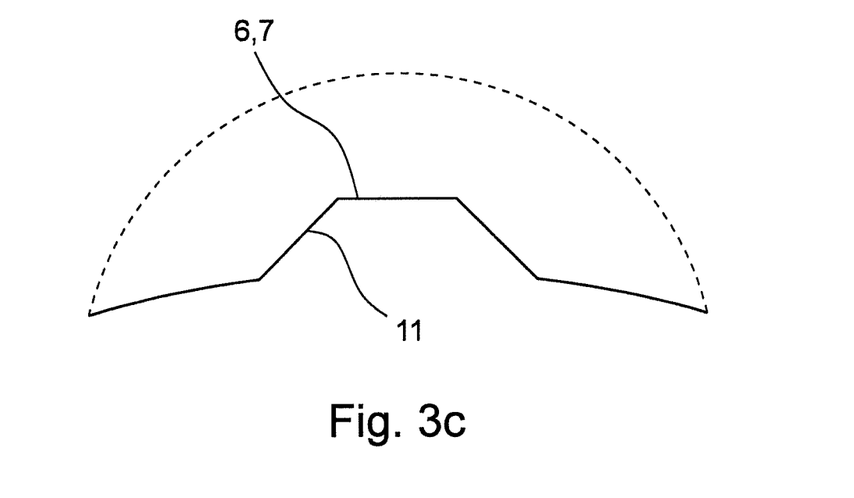

FIGS. 3a to 3c show possible embodiments of the recesses 8, 9, and 10. According to the embodiment shown in FIG. 3a, each reflection surface 6, 7 is configured as a circular arc of a circle with the radius $R_2$ and the side walls are configured substantially perpendicular to the circular arc. According to the embodiment shown in FIG. 3b, the reflection surface 6, 7 is made flat and the side walls 11 are configured substantially perpendicular to the reflection surface 6, 7. According to the embodiment shown in FIG. 3c, the reflection surface 6, 7 is made flat and the side walls 11 form an obtuse angle with the reflection surface 6, 7.

Figure 4:
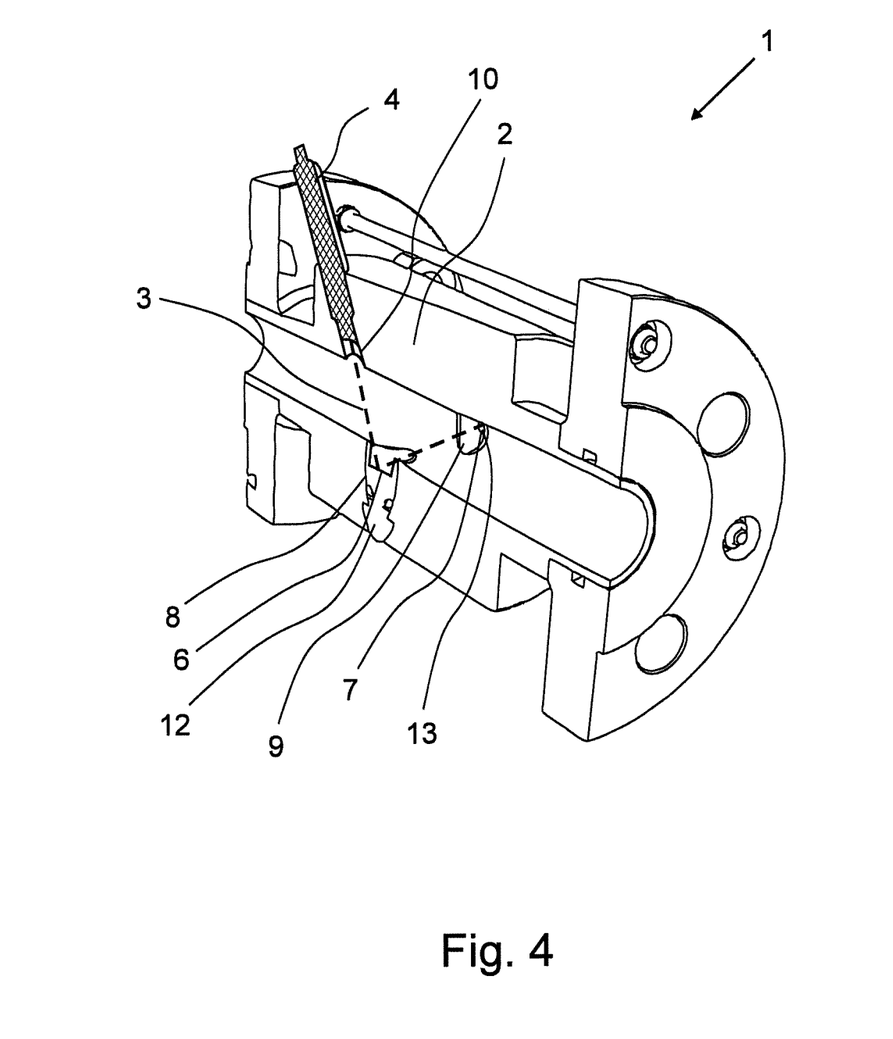
FIG. 4 is a sectional view of a second embodiment of a flowmeter according to the invention.

FIG. 4 shows a sectional representation of a second embodiment of the flowmeter 1, with a measuring tube 2, with two ultrasonic transducers 4, 5, which are designed each as ultrasonic transmitter and ultrasonic receiver. Only one ultrasonic transducer 4 is shown in the sectional view and the measuring tube 2 has four recesses 8, 9, and 10, of which three recesses 8, 9, and 10 are shown. The ultrasonic transducer 4 is arranged in a recess 10. Reflection elements 12 and 13 with reflection surfaces 6 and 7 are arranged in each of the two remaining recesses 8 and 9.

In the illustrated embodiment, the recesses 8, 9, and 10 are configured as blind holes, in which the ultrasonic transducers 4, 5 or the reflection elements 12, 13 are inserted in a sealing manner. The reflection surfaces 6, 7, are made flat. The measuring path 3 of the ultrasonic signal corresponds overall to an equilateral triangle in an axial plan view.

Figure 5:
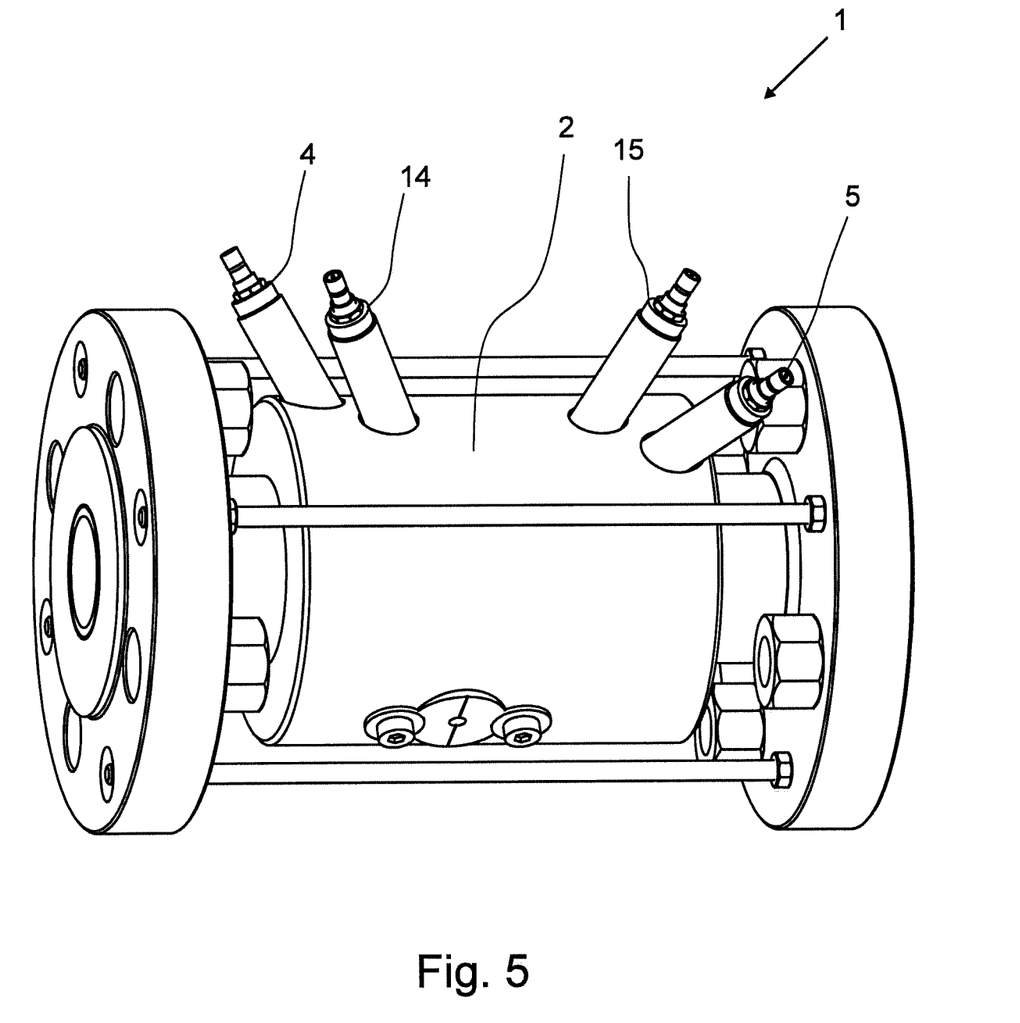
FIG. 5 is a third embodiment of a flowmeter of the invention.

FIG. 5 shows a third embodiment of the flow meter 1, wherein in addition to the two ultrasonic transducers 4, 5 for measuring the flow profile in the edge region, two further ultrasonic transducers 14, 15 are provided. Transducers 14, 15 are arranged on the measuring tube 2 such that they measure the flow profile in the area of the measuring tube axis by means of a V-shaped measuring path. According to this embodiment, the flow profile can be measured particularly precisely both in the region of the measuring tube axis and particularly precisely in the edge region and with only four ultrasonic transducers 4, 5, 14, 15. The error in determining the speed of the medium and the determination of the volume flow is thus particularly small.

Figure 6:
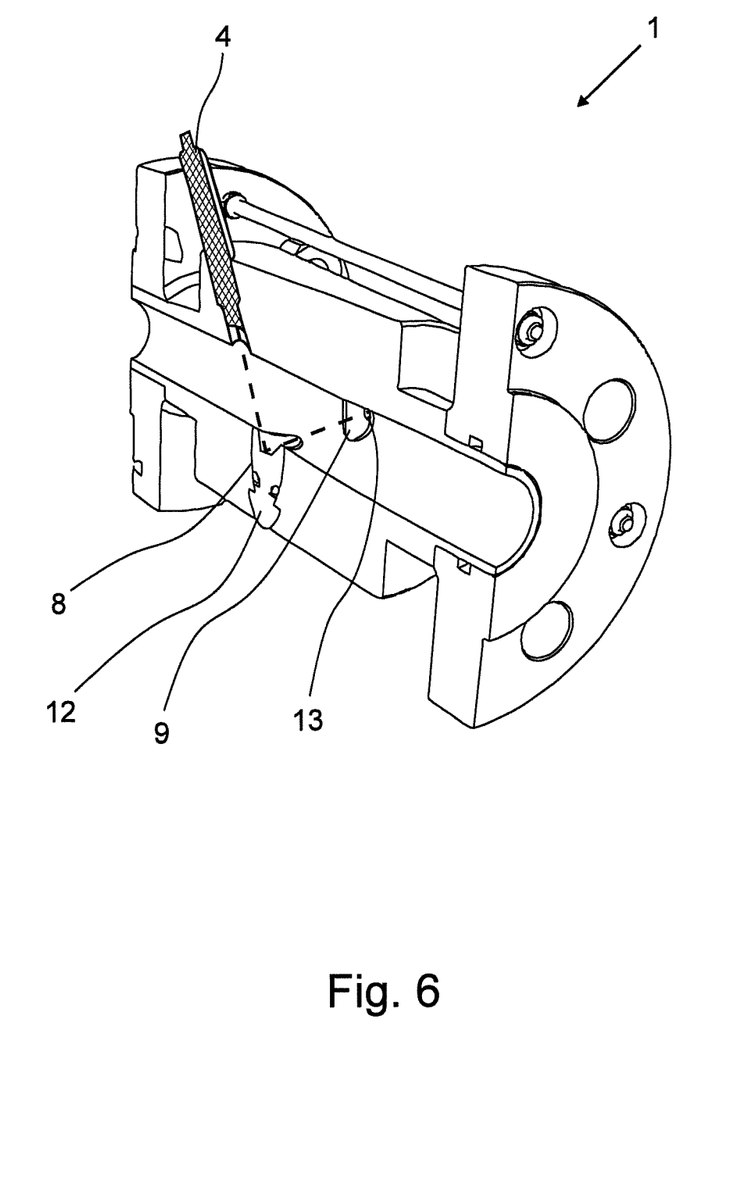
FIG. 6 is a sectional view of a fourth embodiment of a flowmeter of the invention.

FIG. 6 shows a fourth embodiment of the flowmeter 1 with two ultrasonic transducers 4, 5 and two reflection elements 12, 13, which are arranged in recesses 8, 9, in a sectional view, wherein only one ultrasonic transducer 4 is shown, as above. The reflection elements 12, 13 are configured in their design such that, on the one hand, the largest possible part of the ultrasonic signal is reflected and, on the other hand, any excited surface waves are guided away from the measuring path 3 and away from the ultrasonic receiver 4, 5, so they do not influence measurement as interference signals.

Figure 7:
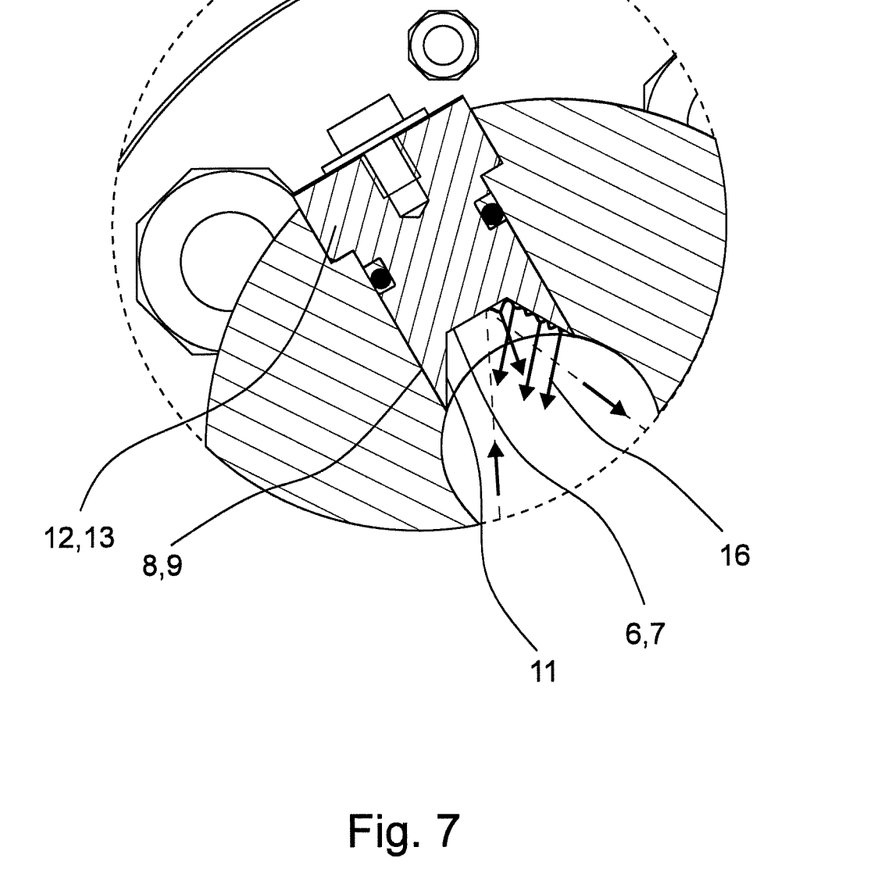
FIG. 7 illustrates the reflection element in the recess according to the fourth embodiment.
Figure 8A:
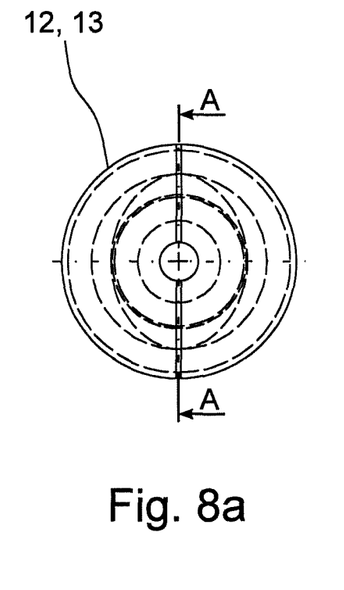
FIGS. 8a-8d illustrate different views of the reflection element according to the fourth embodiment.
Figure 8B:
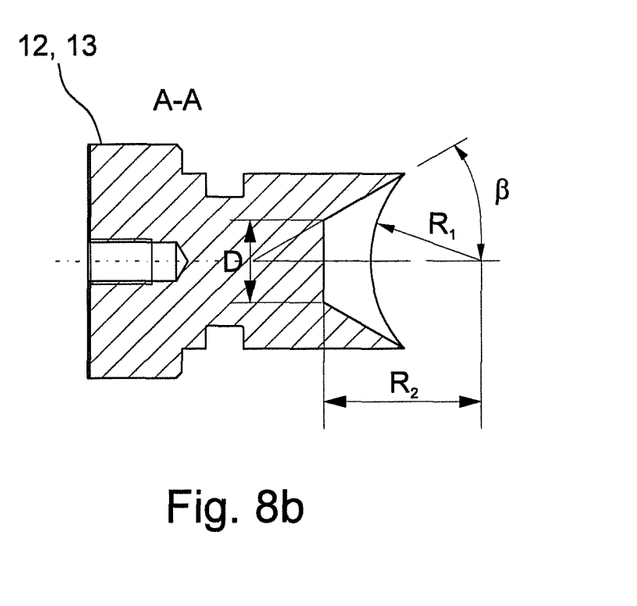
Figure 8C:
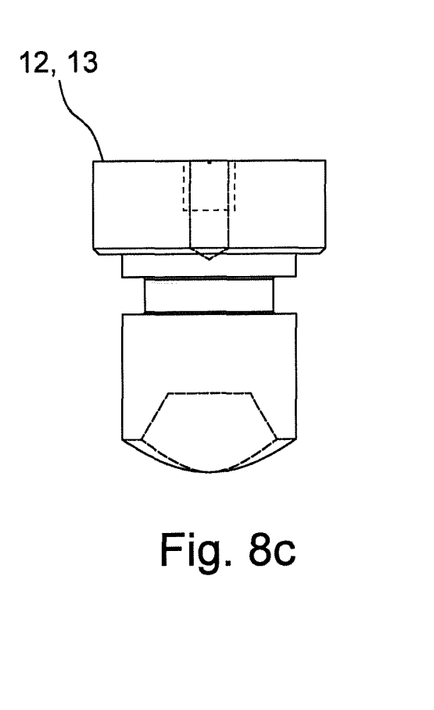
Figure 8D:
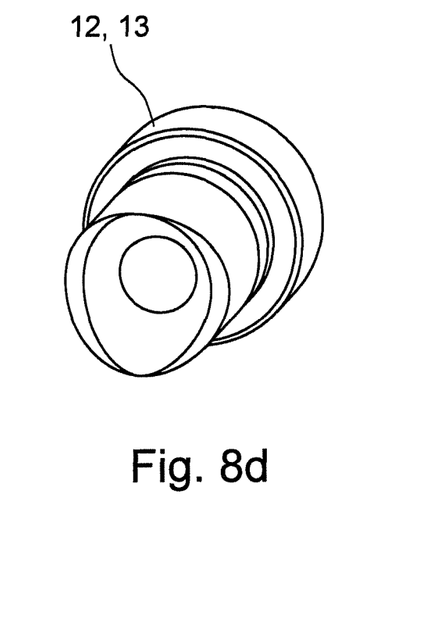

FIG. 7 shows an enlarged illustration of a reflection element 12, 13 arranged in FIG. 6 in a recess 8, 9. The reflection element 12, 13 has a flat reflection surface 6, 7 and oblique side walls 11. The diameter of the reflection surface 6, 7 is dimensioned such that a large part of the ultrasonic signal is reflected. If the incident ultrasonic signal has an angle exceeding the critical angle according to Snell's law of refraction, surface waves are formed. The reflection element 12, 13 then emits a further acoustic signal 16 into the medium. In this case, the reflection element 12, 13 is designed such that the radiation of the interference signal 16 does not occur in the propagation direction of the ultrasonic signal of interest due to the oblique side surfaces.

FIGS. 8a to 8d show different views of the reflection element 12, 13 shown in FIGS. 6 and 7. The reflection surface 6, 7 is configured in a circle with a diameter D, wherein D essentially corresponds to the diameter of the reflected ultrasonic signal. The side walls 11 form an acute angle β with the vertical line to the reflecting surface 6, 7. Overall, the surface facing the medium has the shape of a top surface of a truncated cone, wherein the edge of the truncated cone has the shape of a section of the truncated cone foot with a part of a circular cylinder and wherein the base of the cylinder has a radius $R_1$.

What is claimed is:

1. An ultrasonic flowmeter comprising:
   at least one measuring tube wherein the measuring tube has at least one recess formed in the measuring tube and is provided with at least a first ultrasonic transducer and a second ultrasonic transducer;
   wherein the first ultrasonic transducer is designed as an ultrasonic transmitter and/or as an ultrasonic receiver and the second ultrasonic transducer is designed as an ultrasonic transmitter and/or as an ultrasonic receiver and with at least one reflection surface;
   wherein the first and second ultrasonic transducers are arranged on the measuring tube such that the measuring path between the first and the second ultrasonic transducers comprises at least one reflection at the reflecting surface,
   wherein the reflection surface is arranged in the recess,
   wherein the sidewalls of the recess are configured obliquely and include an obtuse angle with the reflection surface or
   wherein a reflection element with the reflection surface is arranged in the at least one recess.

2. The ultrasonic flowmeter according to claim 1, wherein at least a first and at least a second reflection surface and at least a first and a second recess are provided, wherein the first reflection surface is arranged in the first recess and the second reflection surface is arranged in the second recess, wherein the first and the second ultrasonic transducer are arranged on the measuring tube such that the measuring path between the ultrasonic transducers comprises at least one reflection at the first reflection surface and at least one reflection at the second reflection surface.

3. The ultrasonic flowmeter according to claim 1, wherein the reflection surface is configured flat or concave or in the form of a circular arc.

4. The ultrasonic flowmeter according to claim 1, wherein the reflection element is configured such that the surface facing the medium has the shape of a top surface of a truncated cone, wherein the edge of the truncated cone has the shape of a section of the truncated cone foot with a part of a cylinder.

5. The ultrasonic flowmeter according to claim 1, wherein the reflection element is at least partially made of synthetic material or metal, in particular bronze, brass, steel, aluminum or titanium.

6. The ultrasonic flowmeter according to claim 1, wherein the ultrasonic transducers are at least partially arranged in the lower half of the measuring tube.

7. The ultrasonic flowmeter according to claim 1, wherein at least one further recess is provided and that the first and/or the second ultrasonic transducer is or are arranged in the at least one further recess.

8. The ultrasonic flowmeter according to claim 1, wherein at least a third and a fourth ultrasonic transducer are provided, which are each designed as an ultrasonic transmitter and/or as an ultrasonic receiver, wherein the third and the fourth ultrasonic transducers are arranged offset in the flow direction on the measuring tube, that the measuring path between the third and the fourth ultrasonic transducer intersects the measuring tube axis.

9. The ultrasonic flowmeter according to claim 1, wherein the recess has a trapezoidal shape when viewed in cross section.

* * * * *